(12) United States Patent
Fukushima

(10) Patent No.: US 6,975,766 B2
(45) Date of Patent: Dec. 13, 2005

(54) SYSTEM, METHOD AND PROGRAM FOR DISCRIMINATING NAMED ENTITY

(75) Inventor: Toshikazu Fukushima, Tokyo (JP)

(73) Assignee: NEC Corporation, Tokyo (JP)

(*) Notice: Subject to any disclaimer, the term of this patent is extended or adjusted under 35 U.S.C. 154(b) by 777 days.

(21) Appl. No.: 09/947,696

(22) Filed: Sep. 7, 2001

(65) Prior Publication Data

US 2002/0031269 A1 Mar. 14, 2002

(30) Foreign Application Priority Data

Sep. 8, 2000 (JP) .............................. 2000-278691

(51) Int. Cl.$^7$ .............................................. G06K 9/62
(52) U.S. Cl. ................................................... 382/229
(58) Field of Search .............................. 382/181, 209, 382/224, 228, 229, 305, 231; 707/1–10, 102; 715/501.1, 513, 515–516, 532

(56) References Cited

U.S. PATENT DOCUMENTS

| | | | | |
|---|---|---|---|---|
| 5,961,601 A * | 10/1999 | Iyengar | ...................... | 709/229 |
| 6,076,088 A * | 6/2000 | Paik et al. | ...................... | 707/5 |
| 6,202,065 B1 * | 3/2001 | Wills | .............................. | 707/5 |
| 6,446,061 B1 * | 9/2002 | Doerre et al. | ................... | 707/3 |
| 6,466,940 B1 * | 10/2002 | Mills | .......................... | 707/102 |
| 6,650,998 B1 * | 11/2003 | Rutledge et al. | ............ | 701/211 |
| 6,654,813 B1 * | 11/2003 | Black et al. | ................. | 709/245 |
| 6,665,687 B1 * | 12/2003 | Burke | ...................... | 707/104.1 |

FOREIGN PATENT DOCUMENTS

JP 6-52221 2/1994

OTHER PUBLICATIONS

Pfeifer, et al. "Searching proper names in databases", IEEE, pp. 1-13, 1994.*
Sekine et al., "Difficulty in the Definition of Named Entity-from exempla of Defining NE in IREX (Information Retrieval and Extraction", The 5$^{th}$ Annual Conference Of the Language Processing Institute, (Mar. 1999),. pp. 128-131.
Takemoto, Y. et al., "Development of the Named Entity Extracting System and Opinion for the System in IREX-NE", IREX Work Shop, (Sep. 1999) pp. 171-178.

* cited by examiner

Primary Examiner—Daniel Mariam
(74) Attorney, Agent, or Firm—Foley & Lardner LLP

(57) ABSTRACT

A named entity discriminating system capable of discriminating names entities such as location names, personal names, and organization names in text with a high degree of accuracy is provided. A reading means reads text from a hypertext database. A single text analyzing means analyzes each text read by the reading means and detects candidates for the named entity in the text. A complex text analyzing means estimates the likelihood of the candidate named entity detected by the single text analyzing means by an analysis with reference to referring link text or linked text of the text in which the candidate named entity appears.

15 Claims, 13 Drawing Sheets

FIG. 3

Baseball.html

```
<HTML>
<HEAD>
<TITLE> Baseball Fan's Page </TITLE>
</HEAD>
<BODY>
<H1>Cheer For Professional Baseball </H1>

From Each Team's Fans

○ <A HREF="BaystarsFan.html">Baystars Fan </A>
○ <A HREF="GiantsFan.html">Giants Fan </A>
○
</BODY>
</HTML>
```

| IDENTIFYING INFORMATION FOR OBJECT TEXT | | | |
|---|---|---|---|
| IDENTIFICATION NUMBER | CANDIDATE NAMED ENTITY | POSITIONAL INFORMATION | CATEGORY |
| | | | |
| | | | |
| | | | |
| | | | |

F I G. 11
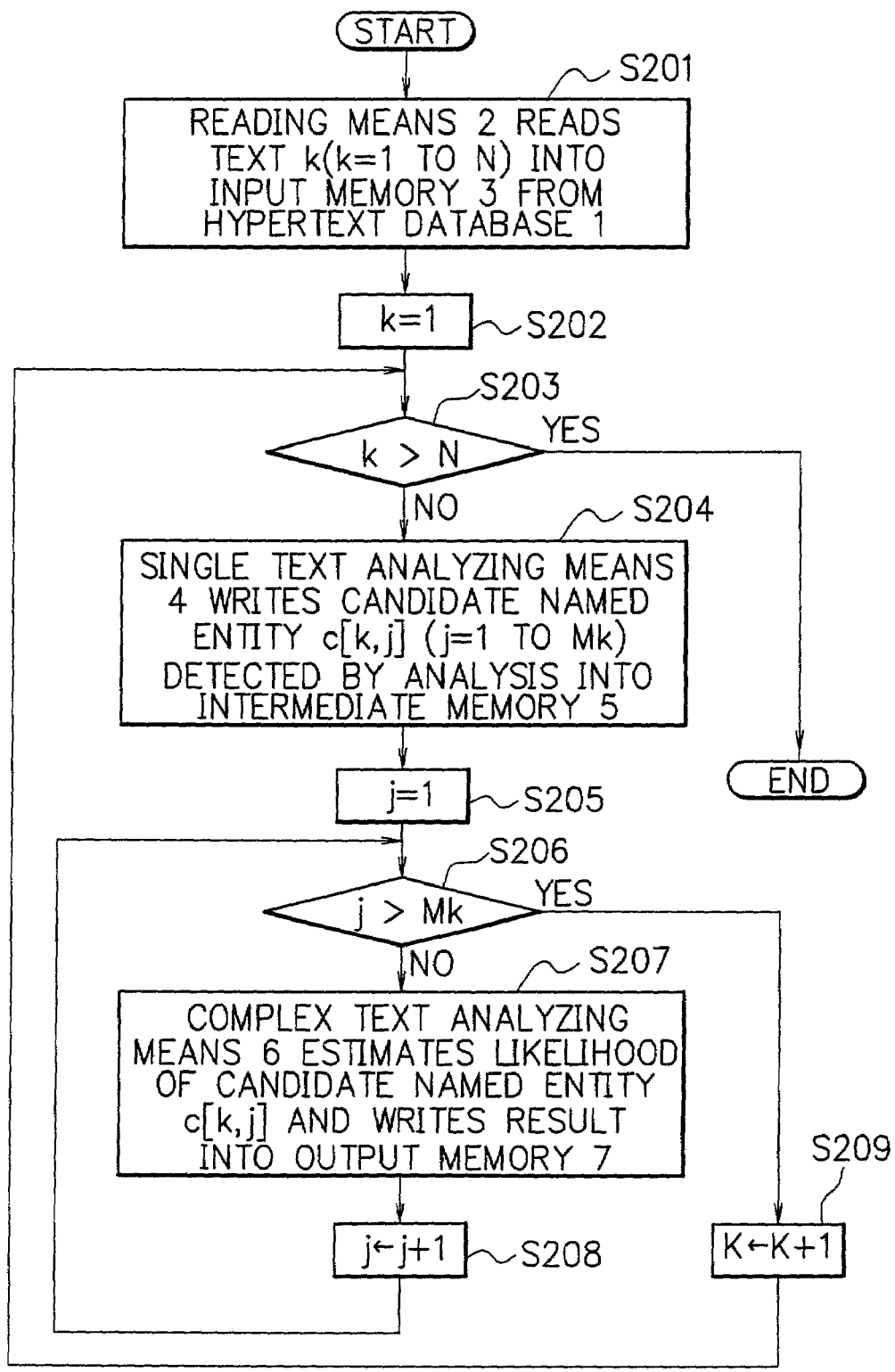

| 60 | 61 |
|---|---|
| MINATO-KU,TOKYO | 31 |
| FUCYU-SHI,TOKYO | 39 |
| KAWASAKI-SHI,KANAGAWA | 40 |
| MAEBASHI-SHI,GUNMA | 40 |
| NIKKOH-SHI,TOCHIGI | 52 |
|  |  |

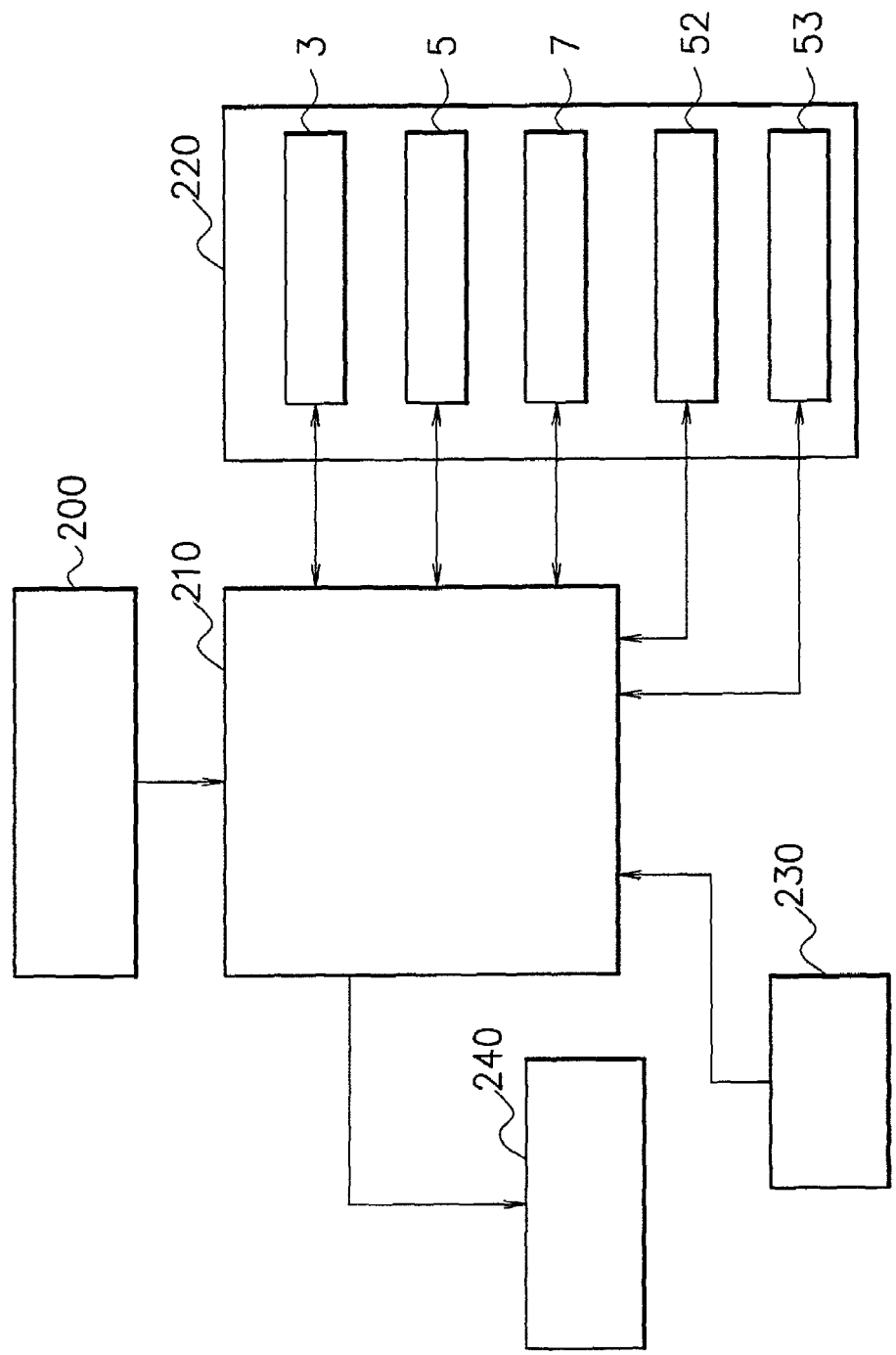

SYSTEM, METHOD AND PROGRAM FOR DISCRIMINATING NAMED ENTITY

BACKGROUND OF THE INVENTION

The present invention relates to a named entity discriminating system, a named entity discriminating method and a named entity discriminating program for detecting proper terms, such as location names, personal names and organization names in text. The term "named entity" indicates those location names, personal names and organization names, and is defined as the vocabulary of terms used in the field in the article "Difficulty in the Definition of Named Entity—from exempla of defining NE in IREX (Information Retrieval and Extraction)" written by Satoshi Sekine and Yoshio Eriguchi on pages 128 to 131 in the collected papers for "The 5$^{th}$ Annual Conference of the Language Processing Institute" (March, 1999), or in "IREX workshop" (September, 1999).

DESCRIPTION OF THE RELATED ART

The most basic method to retrieve the named entity is preparing a dictionary for the named entity and discriminating the named entity in text by collating the text with the dictionary. For example, by having registered such words as "Yokohama" (location name) and "Yokohama Baystars" (organization name) in the dictionary, the word "Yokohama" is retrieved as a location name when "Yokohama" appears in text. Similarly, when "Yokohama Baystars" appears in text, it is retrieved as an organization name.

However, it happens that the named entity is not to be discriminated only by the simple collation with the dictionary. As in the case that the word "Washington", which is a personal name as well as a location name, appears in text, when a word can be taken either way, plural interpretations (ambiguity) are made. In the same way, when the word "Green", which can be identified as a personal name and also a common noun, turns up in text, ambiguity is produced. Moreover, even though the term "Portland", for example, can be identified as a location name, it is still indeterminable that whether it indicates "Portland" in Oregon or "Portland" in Maine, etc.

In order to resolve the ambiguity in identifying the named entity, the following two methods have been proposed. Both the methods are described in articles of preliminary reports for the "IREX workshop", especially in the article "Development of the Named Entity Extracting System and Opinion for the System in IREX—NE" (written by Yoshimi Takemoto, Syunichi Fukushima, Hiroshi Yamada, Akitoshi Okumura, and Takahiro Ikeda).

In one method, ambiguity in a candidate word for the named entity is resolved by referring to a co-occurring word(s) or a correlated word(s), which often goes with the candidate word, appearing before or after the candidate named entity or in the same text. For example, if the co-occurring word "sensyu" (Japanese equivalent for "player", which collocates with an athlete's name), appears next to the candidate named entity "Chiba", which is used as a personal name as well as a location name just like the word "Washington", the candidate "Chiba" can be identified as a personal name. Besides, in the case where there is detected the candidate named entity "Chuo-ku", which is a location name in Japan and the place called "Chuo-ku" exists in both Tokyo and Osaka similarly to the word "Portland", if the correlated word "Tokyo" is found in the same text, it is highly likely that the candidate "Chuo-ku" indicates "Chuo-ku" in Tokyo.

In the other method, the ambiguity is resolved by searching for an expression(s) including the candidate named entity in the same text. The candidate "Yokohama", for example, can be an abbreviation of "Yokohama Baystars" (Japanese professional baseball team), namely, an organization name, as well as a location name. If the expression "Yokohama Baystars" is found in the same text, it is likely that the candidate "Yokohama" is an organization name.

As the prior art in the technical field similar to that of the present invention, there is found "Automatic Proper Noun Extraction System" described in Japanese Patent Application Laid-Open No. HEI6-52221.

The prior art is characterized by comprising: a database accessing means for accessing online text in natural language interfaces such as an online database, an expert system and a machine translation system; a proper noun extracting means for extracting candidates for the proper noun from the text obtained by the database accessing means with reference to patterns of proper nouns prepared in advance; a proper noun judging means for judging whether or not the candidate proper nouns extracted by the proper noun extracting means are registered in a dictionary, and extracting unregistered candidates; and a proper noun registering means for registering the unregistered candidate proper nouns extracted by the proper noun judging means in the dictionary.

However, both the above two methods and the automatic proper noun extraction system are carried out based on the analytical operation in only one text. Consequently, sufficient identification accuracy may not be achieved for the text on each node page that constitutes a hypertext database such as the WWW (World Wide Web) by the conventional technique using information from the text containing a candidate named entity in question only for the analysis.

SUMMARY OF THE INVENTION

It is therefore an object of the present invention to provide a named entity discriminating system, a named entity discriminating method and a named entity discriminating program, capable of identifying named entities (location names, personal names, organization names, etc.) in the text on node pages included in a hypertext database such as the WWW with a high degree of accuracy.

In accordance with the first aspect of the present invention, for achieving the above object, there is provided a named entity discriminating system for detecting named entities such as location names, personal names and organization names in text, comprising: a reading means for reading text from a hypertext database; a single text analyzing means for analyzing the text read by the reading means to detect candidates for the named entity; and a complex text analyzing means for estimating the likelihood of the candidate named entity detected by the single text analyzing means by an analysis with reference to both referring link text and linked text, or either of them, of the text containing the candidate.

In accordance with the second aspect of the present invention, in the first aspect, the complex text analyzing means estimates the likelihood of the candidate named entity detected by the single text analyzing means based on appearance frequency information of a word(s) co-occurring/correlating with the candidate in referring link text and linked text, or either of them, of the text containing the candidate.

In accordance with the third aspect of the present invention, in the first aspect, the complex text analyzing means estimates the likelihood of the candidate named entity detected by the single text analyzing means based on co-occurrence relations between the candidate and a key character string in referring link text of the text containing the candidate.

In accordance with the fourth aspect of the present invention, in the first aspect, the complex text analyzing means estimates the likelihood of the candidate named entity detected by the single text analyzing means based on appearance frequency information of a word(s) co-occurring with the candidate in a specified range before and after a key character string in referring link text of the text containing the candidate.

In accordance with the fifth aspect of the present invention, in one of aspects the second to the fourth, when no co-occurring word is found in both referring link text and linked text, or either of them, of the text containing the candidate named entity, the complex text analyzing means searches for the co-occurring word(s) referring to referring link text or linked text of the text in which no co-occurring word is detected.

In accordance with the sixth aspect of the present invention, in one of aspects the second to the fourth, the complex text analyzing means follows links from the text containing the candidate named entity to its referring link text or linked text within prescribed link layers, which is specified as a reference range, and detects the co-occurring word(s).

In accordance with the seventh aspect of the present invention, in one of aspects the second to the fourth, the complex text analyzing means estimates the likelihood of the candidate named entity based on the weight assigned to each co-occurring word, which varies depending on the position where the co-occurring word appears.

In accordance with the eighth aspect of the present invention, there is provided a named entity discriminating method, comprising steps of: reading text from a hyper text database; analyzing the text to detect candidates for the named entity; and estimating the likelihood of the candidate named entity by an analysis with reference to both referring link text and linked text, or either of them, of the text containing the candidate.

In accordance with the ninth aspect of the present invention, in the eighth aspect, the likelihood of the candidate named entity is estimated based on appearance frequency information of a word(s) co-occurring with the candidate in referring link text and linked text, or either of them, of the text containing the candidate.

In accordance with the tenth aspect of the present invention, in the eighth aspect, the likelihood of the candidate named entity is estimated based on the co-occurrence relation between the candidate and a key character string in referring link text of the text containing the candidate.

In accordance with the eleventh aspect of the present invention, in the eighth aspect, the likelihood of the candidate named entity is estimated based on appearance frequency information of a word(s) co-occurring with the candidate in a specified range before and after a key character string in referring link text of the text containing the candidate.

In accordance with the twelfth aspect of the present invention, in one of aspects the ninth to the eleventh, when no co-occurring word is found in both referring link text and linked text, or either of them, of the text containing the candidate named entity, referring link text or linked text of the text in which no co-occurring word is found is searched for the co-occurring word(s).

In accordance with the thirteenth aspect of the present invention, in one of aspects the ninth to the eleventh, the likelihood of the candidate named entity is estimated by following links from the text containing the candidate named entity to its referring link text or linked text for detecting the co-occurring word(s) within prescribed link layers from the text containing the candidate, which is specified as a reference range.

In accordance with the fourteenth aspect of the present invention, in one of aspects the ninth to the eleventh, the likelihood of the candidate named entity is estimated based on the weight assigned to each co-occurring word, which varies depending on the position where the co-occurring word appears.

In accordance with the fifteenth aspect of the present invention, there is provided a named entity discriminating program to execute processes including: a reading process for reading text from a hypertext database; a single text analyzing process for analyzing the text read in the reading process to detect candidates for the named entity; and a complex text analyzing process for estimating the likelihood of the candidate named entity detected in the single text analyzing process by an analysis with reference to both referring link text and linked text, or either of them, of the text containing the candidate.

In accordance with the sixteenth aspect of the present invention, in the fifteenth aspect, the complex text analyzing process estimates the likelihood of the candidate named entity detected in the single text analyzing process based on appearance frequency information of a word(s) co-occurring with the candidate in referring link text and linked text, or either of them, of the text containing the candidate.

In accordance with the seventeenth aspect of the present invention, in the fifteenth aspect, the complex text analyzing process estimates the likelihood of the candidate named entity detected in the single text analyzing process based on co-occurrence relations between the candidate and a key character string in referring link text of the text containing the candidate.

In accordance with the eighteenth aspect of the present invention, in the fifteenth aspect, the complex text analyzing process estimates the likelihood of the candidate named entity detected in the single text analyzing process based on appearance frequency information of a word(s) co-occurring with the candidate in a specified range before and after a key character string in referring link text of the text containing the candidate.

In accordance with the nineteenth aspect of the present invention, in one of aspects the sixteenth to the eighteenth, when no co-occurring word is found in both referring link text and linked text, or either of them, of the text containing the candidate named entity, the complex text analyzing process searches for the co-occurring word(s) referring to referring link text or linked text of the text in which no co-occurring word is detected.

In accordance with the twentieth aspect of the present invention, in one of aspects the sixteenth to the eighteenth, the complex text analyzing process follows links from the text containing the candidate named entity to its referring link text or linked text for detecting the co-occurring word(s) within prescribed link layers from the text containing the candidate, which is specified as a reference range.

In accordance with the twenty-first aspect of the present invention, in one of aspects the sixteenth to the eighteenth, the complex text analyzing process estimates the likelihood of the candidate named entity based on the weight assigned to each co-occurring word, which varies depending on the position where the co-occurring word appears.

BRIEF DESCRIPTION OF THE DRAWINGS

The objects and features of the present invention will become more apparent from the consideration of the following detailed description taken in conjunction with the accompanying drawings in which:

FIG. 3 is a diagram showing an example of text written in HTML;

FIG. 11 is a flowchart showing operations according to the embodiment of the present invention.

FIG. 16 is a block diagram showing the forth embodiment of the present invention.

DESCRIPTION OF THE PREFERRED EMBODIMENTS

Figure 1:
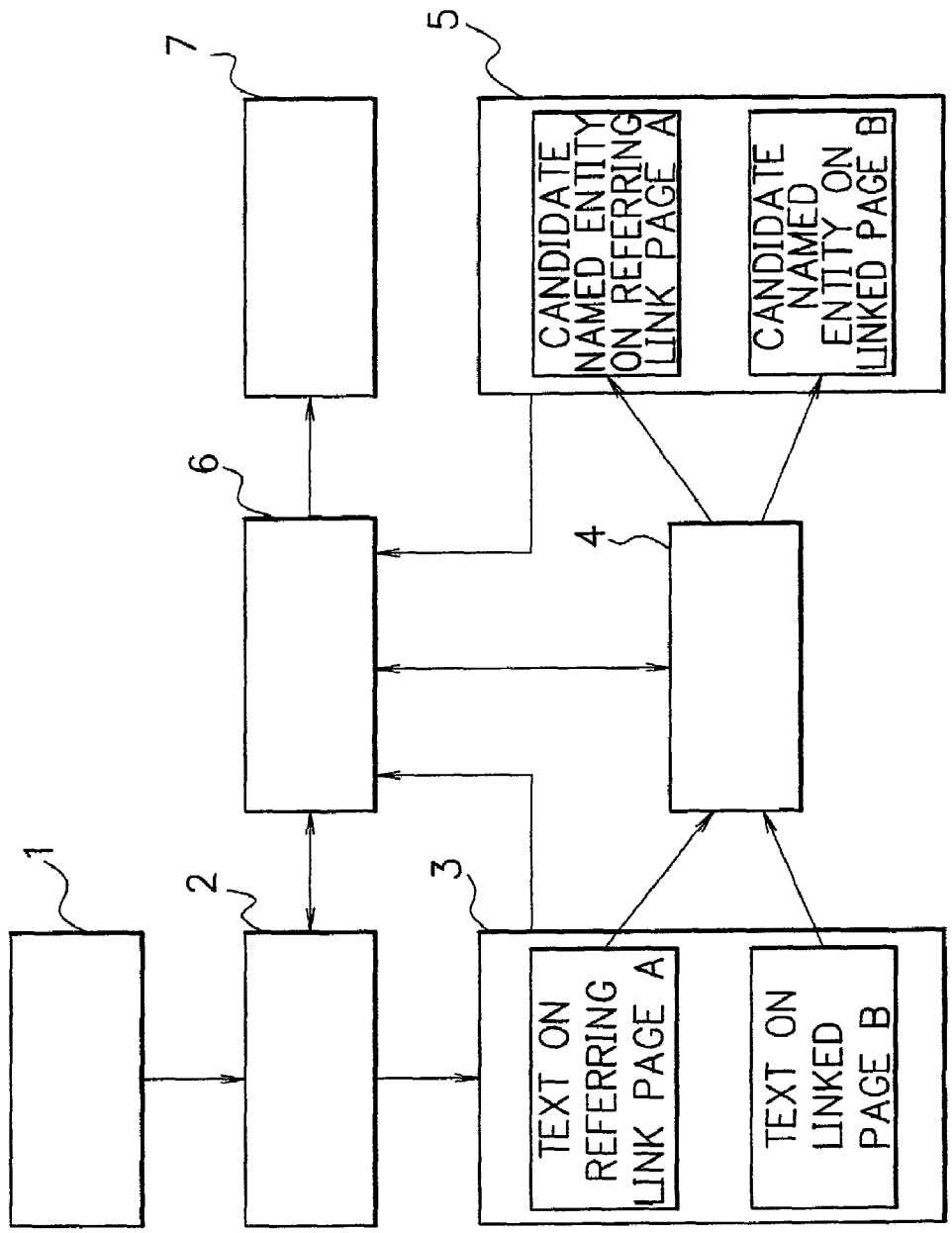
FIG. 1 is a block diagram showing an embodiment of the present invention.

Referring now to the drawings, a description of preferred embodiments of the present invention will be given in detail.

As shown in FIG. 1, a named entity discriminating system according to the first embodiment of the present invention, which supplies a list of named entities in the text on node pages included in a hypertext database 1, comprises: a reading means 2, an input memory 3, a single text analyzing means 4, an intermediate memory 5, a complex text analyzing means 6 and output memory 7. Each means is realized by a computer that operates by program control. Both the main memory section of a computer and external memory devices such as a disk storage drive, a magnet-optical disk storage drive and the like are available for the input memory 3, the intermediate memory 5 and the output memory 7.

Next, hypertext, or processing objects in this embodiment will be explained.

Figure 2:
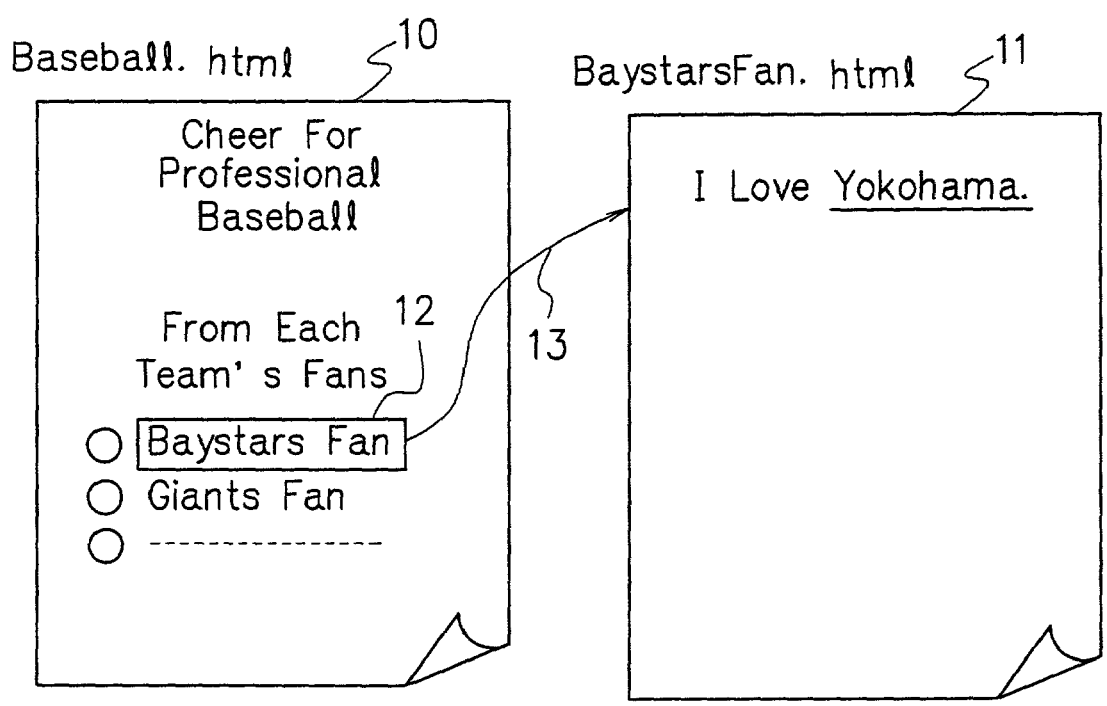
FIG. 2 is a diagram showing an example of processing objects in the embodiment of the present invention.

FIG. 2 shows an example of a part of the hypertext database 1, which is to be inputted to the named entity discriminating system. In the format of the hypertext, a page (or a node) is a fundamental unit, and links are set up between respective pages. Numeric characters 10 and 11 denote examples of the pages included in the hypertext database 1, and a line denoted by the numeric character 13 connecting between the pages indicates the link. Concerning the link 13, the page 10 is a referring link page (referring link text), and the page 11 is a linked page (linked text). Although some of the hypertext of the sort have original data structure, such markup languages as SGML (Standard Generalized Markup Language), HTML (Hyper Text Markup Language), and XML (Extensible Markup Language) have been prevalent to make out the page. Especially HTML is commonly used for the large-scale hypertext database called the WWW on the Internet.

In FIG. 3, the page 10 of FIG. 2 is written in HTML as an example. The part in angle brackets < > is a markup tag, and a character string in between A-tags indicates a linked page in HTML. That is, the character string "Baysters Fan" in FIG. 2 is a referring key character string, or a link to a linked page. In addition, following directly after HREF is the HTML text name of the linked page. This means that it is possible to hop from the key character string "Baysters Fan" in the page 10 to the HTML text named "BaystersFan", which is illustrated as the page 11 in FIG. 2. Incidentally, the hypertext database written in HTML has been described as an example, however, the present invention does not limit the language available for the hypertext to HTML. Other markup languages, for example, SGML and XML can be used in making out the hypertext. Besides, the hypertext may have original data structure as well.

The reading means 2 reads pages (text) into the input memory 3 from the hypertext database 1. The reading means 2 also has a mechanism for communicating with the outside through a network or a mechanism for accessing an external memory device depending on the location of the hypertext database 1. Regarding the pages to be read, there are several approaches as follows: (A) to set an object page(s) for reading on each occasion and read the page(s), (B) to specify a range subject to reading in the hypertext and read page(s) in the specified range, and (C) to follow the links in the hypertext automatically and read all linked pages. For conducting (A) and (B), the reading means 2 needs an external input device such as a keyboard or a mouse to enter instructions on the object page(s) or range into a computer. The above approaches for realizing the reading means 2 are generally known. In a hypertext database written in HTML, for example, (A) is a basic function of the widely used WWW browser such as the Netscape Navigator or Microsoft Internet Explorer, (B) is referred to as an autopilot tool, and (C) is made practicable as a system called a WWW robot or a crawler.

Figures 4, 5:
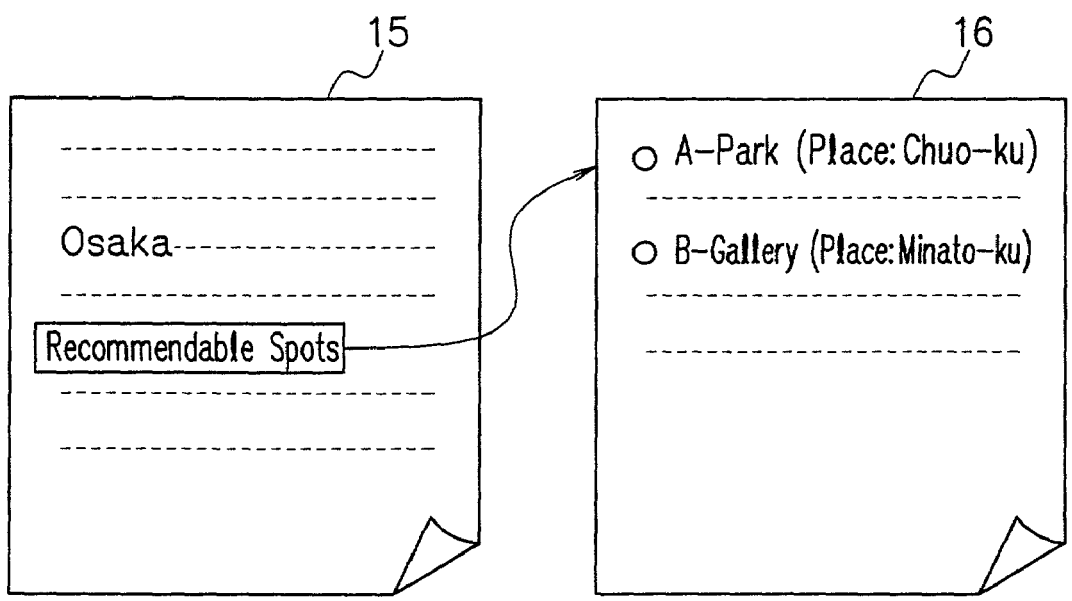
FIG. 4 is a diagram showing an example of a management table of an intermediate memory.
FIG. 5 is a diagram showing another example of processing objects in the embodiment of the present invention.

The single text analyzing means 4 detects candidates for the named entity in the text read into the input memory 3 by making an analysis of the text. The single text analyzing means 4 is equivalent to the conventional named entity extraction system, and therefore it can be realized by the known technique described previously in the description of the related art. The single text analyzing means 4 retrieves a text from the input memory 3, analyzes the text, and inputs detected candidates for the named entity in the text into the intermediate memory 5. The information inputted into the intermediate memory 5 is a list of candidate named entities detected in the object text, including positional information (information about the position where a candidate named entity appears in the text) and a category (location name, personal name, organization name, etc.) of each candidate. In this regard, when a candidate admits of plural interpretations on its category, the potential categories, such as "location name or personal name", or "personal name or common noun" are recorded. Incidentally, FIG. 4 shows the structure of a management table of the intermediate memory 5, in which the information of candidate named entities detected by the single text analyzing means 4 is stored.

The complex text analyzing means 6 estimates the likelihood of the candidate named entity detected by the single text analyzing means 4 by an analysis with reference to the referring link text or linked text of the text in which the candidate appears. The analysis or the estimation of the likelihood of the candidate named entity referring to the referring link text and/or linked text is realized in several ways as follows: (D) to estimate the likelihood on the basis of appearance frequency information of a word(s) co-occurring or correlating with the candidate named entity in the referring link text(s) and/or linked text(s) of the text containing the candidate, (E) to estimate the likelihood on the basis of co-occurrence relations between the candidate named entity and a key character string in the referring link text of the text containing the candidate, (F) to estimate the likelihood on the basis of appearance frequency information of a word(s) co-occurring with the candidate named entity in a specified range of text before and after a key character string in the referring link text of the text containing the candidate. In the above analytical processes, the complex text analyzing means 6 refers to the contents of the input memory 3 and the intermediate memory 5 if necessary, and writes the analysis result into the output memory 7. Additionally, the complex text analyzing means 6 shown in FIG. 1 structurally serves as a controller of the whole system, and controls the operation of the reading means 2 and the single text analyzing means 4. However, such control function for the whole system may be constituted separately from the complex text analyzing means 6.

The above-described embodiment is intended to discriminate named entities in the text on node pages included in a hypertext database such as the WWW with a high degree of accuracy.

For example, in the text (page) 11 of FIG. 2, there is the term "Yokohama" that belongs to two categories: the location name and organization name. This ambiguity is not always resolved by an analysis within the text in which the term is found. Moreover, in the text 16 of FIG. 5, there is the location name "Chuo-ku", which produces another ambiguity over whether it indicates "Chuo-ku" in Tokyo or "Chuo-ku" in Osaka.

In order to solve the problems, a named entity discriminating system according to this embodiment is provided with the complex text analyzing means 6, which estimates the likelihood of each candidate named entity detected by the single text analyzing means 4 by an analysis with reference to the referring link text or linked text of the text in which the candidate appears. In the example of FIG. 2, the complex text analyzing means 6 is able to decide that "Yokohama" in the text 11 is more likely to be an organization name by referring to its referring link text 10. In the case of FIG. 5, it is more probable that "Chuo-ku" in the text 16 indicates "Chuo-ku" in Osaka, since "Osaka", a correlating word of "Chuo-ku", is found in its referring link text 15.

Figure 6:
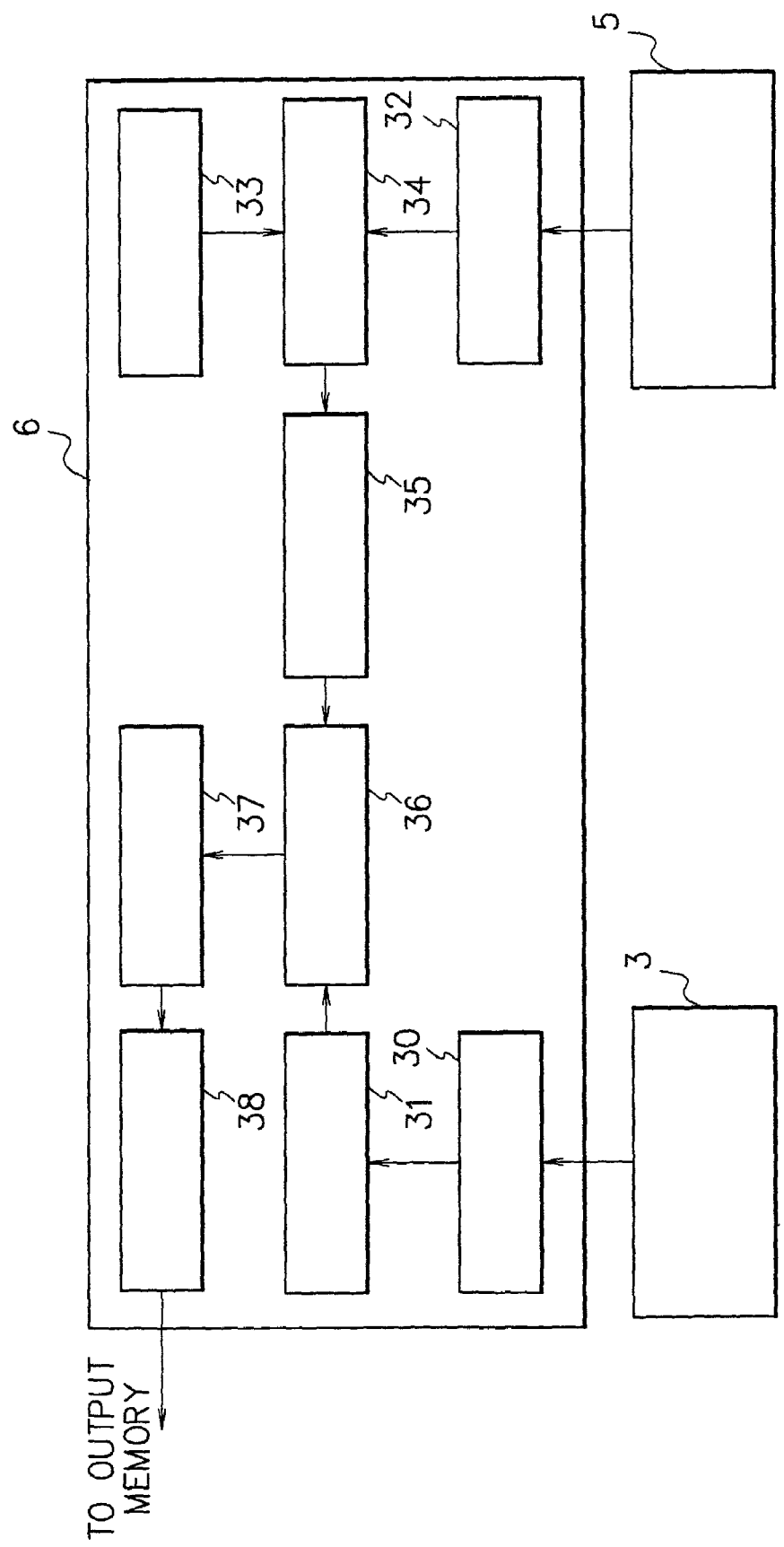
FIG. 6 is a block diagram showing a configuration of a complex text analyzing means.

Referring to FIG. 6, the constitution and operation of the complex text analyzing means 6, a characterizing portion of the present invention, will be explained. As shown in FIG. 6, the complex text analyzing means 6 includes: an input memory read means 30, a text buffer 31, a candidate named entity buffer 32, a named entity dictionary 33, a co-occurring word information readout section 34, a co-occurring word information buffer 35, a co-occurring word detector 36, a detection result memory 37, and a likelihood calculator 38.

The input memory read means 30 reads text stored in the input memory 3. The extent subject to the reading by the input memory read means 30 varies depending on the aforementioned processes (D), (E), and (F), which will be described later. The text buffer 31 temporarily stores the text read by the input memory read means 30.

The candidate named entity buffer 32 reads out candidates for the named entity detected by the single text analyzing means 4 from the intermediate memory 5.

Figures 7, 8:
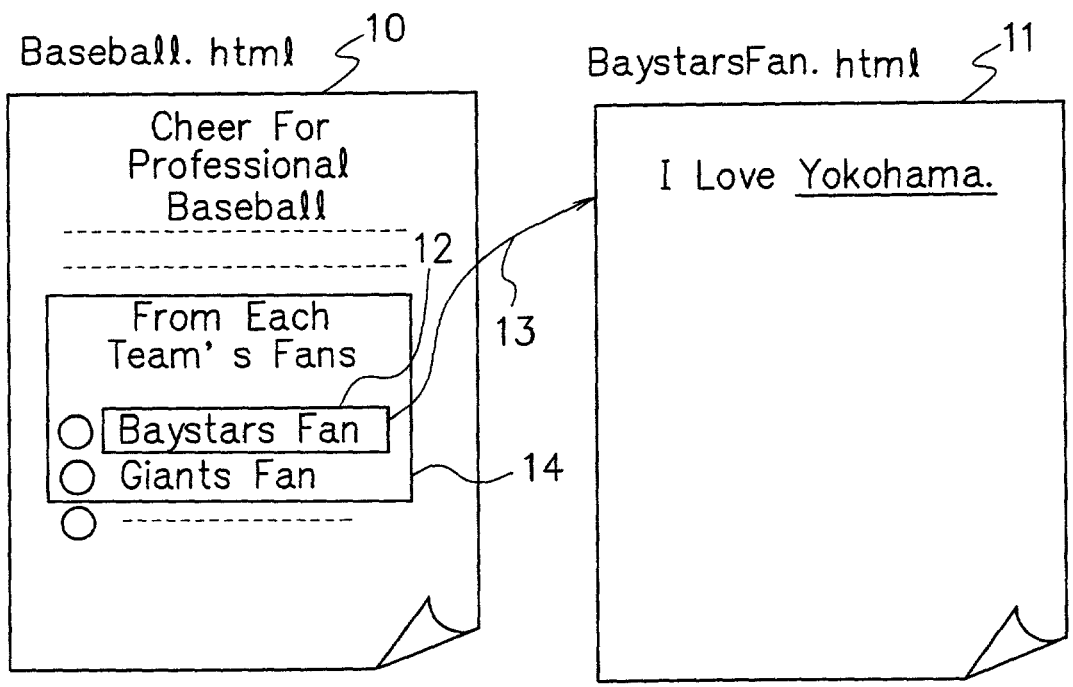
FIG. 7 is a diagram showing contents of a named entity dictionary.
FIG. 8 is a diagram showing an example of processing objects in an embodiment of the present invention.

The named entity dictionary 33 stores a dictionary for identifying the candidate named entities. FIG. 7 shows the structure of the named entity dictionary. As shown in FIG. 7, the named entity dictionary contains potential categories 41, such as "location name", "personal name", and "organization name", for each term of the named entityes 40. (It happens that the categories include non-named entity when the term can be a common noun.) And further, the dictionary stores a co-occurring word list 42 for each category. It is preferable that not only the co-occurring words but also their positional condition (for example, "collocating with the named entity", etc.) is added to the co-occurring word list 42.

The co-occurring word information readout section 34 reads out the categories 41 and co-occurring word lists 42 from the named entity dictionary 33, along with the candidate named entity, its location information and categories from the candidate named entity buffer 32. The information read out by the co-occurring word information readout section 34 is temporarily stored in the co-occurring word information buffer 35.

The co-occurring word detector 36 reads out the co-occurring word lists of the candidate named entity from the co-occurring word information buffer 35, and also the text from the text buffer 31. The detector 36 then searches the text for the co-occurring words listed in the co-occurring word lists. The detected co-occurring words are stored in the detection result memory 37.

The likelihood calculator 38 estimates the likelihood of each conceivable category for the candidate named entity with reference to the co-occurring words stored in the detection result memory 37. The estimation result is supplied to the output memory 7.

In the following, analytical processes (D), (E), and (F) by the complex text analyzing means 6, and the operation according to the above processes will be explained referring to FIG. 2.

In FIG. 2, the page 10 is a referring link text, and the page 11 is a linked text. Assuming that the single text analyzing means 4 analyzes the linked text 11 and detects the term "Yokohama" as a candidate for the named entity, two interpretations (ambiguity): a location name or an organization name, are produced according to the named entity dictionary shown in FIG. 7. The ambiguity is not to be resolved by the single text analyzing means 4 since there is no co-occurring word for "Yokohama" in the text 11. In such cases, the complex text analyzing means 6 estimates the likelihood of the candidate named entity "Yokohama" in the text 11 with reference to the referring link text 10. In the analysis of the complex text analyzing means 6, the reference range varies with the processes (D), (E), and (F) as follows.

According to (D), the complex text analyzing means 6 refers to throughout the referring text 10 for the analysis. The analyzing means 6 finds the words "professional baseball", "team", "Baystars", etc. in the text 10 as co-occurring words, and thereby judges that the candidate "Yokohama" is probably an organization name.

In this process, the input memory read means 30 of the complex text analyzing means 6 reads entire text on the referring link page from among text in the input memory 3, and stores it in the text buffer 31.

The co-occurring word detector 36 searches all over the referring link text in the text buffer 31 for the co-occurring words of the candidate named entity listed in the co-occurring word lists read out of the co-occurring word information buffer 35.

In the process (E), the complex text analyzing means 6 refers to only a key character string(s) on the referring link page. In FIG. 2, the word "Baysters Fan" denoted by the numeric character 12 is the key character string. Since the key character string 12 includes the word "Baystars", which is a co-occurring word of "Yokohama" as an organization name, the complex text analyzing means 6 judges that the candidate "Yokohama" is more likely to be an organization name.

According to (E), the input memory read means 30 reads only key character strings in the text on the referring link page stored in the input memory 3. That is, read means 30 reads a character string(s) on the referring page in which the text name of the text including the candidate named entity is set as a linked text. In the example of FIG. 2, the referring link key character string on the page, in which the text name "BaystarsFan. html" of the text including the candidate "Yokohama" is written between anchor tugs (<A HREF=> . . . </A>), is to be inputted to the text buffer 31.

The co-occurring word detector 36 reads the key character string from the text buffer 31, and detects whether or not the key character string contains a co-occurring word of the candidate named entity listed in the co-occurring word list retrieved from the co-occurring word information buffer 35.

According to the analytical process (F), the complex text analyzing means 6 refers to a certain range of text before and after the referring link key character string as FIG. 8–14. In FIG. 8, the words "team" and "Baystars", co-occurring words of the candidate named entity "Yokohama", appear in the reference range 14, and therefore it can be determined that the candidate "Yokohama" is more likely to be an organization name. In addition, the reference range can be decided in various ways. For example, the range can be the prescribed number of characters before and after the key character string, the prescribed number of lines before and after the key character string, or the whole of the paragraph containing the key character string (or an extent to the third paragraph therefrom).

In the process (E), the input memory read means 30 reads a key character string and text in the prescribed range before and after the key character string from the text on the referring link page stored in the input memory 3.

The co-occurring word detector 36 reads the key character string and the text in the reference range from the text buffer 31, and searches for the co-occurring words of the candidate named entity listed in the co-occurring word lists retrieved from the co-occurring word information buffer 35.

As described above, according to the embodiment of the present invention, the category of each candidate named entity is determined with reference to not only the text containing the candidate but also the referring link text. Thus, it is possible to identify named entities with a high degree of accuracy.

Figure 9:
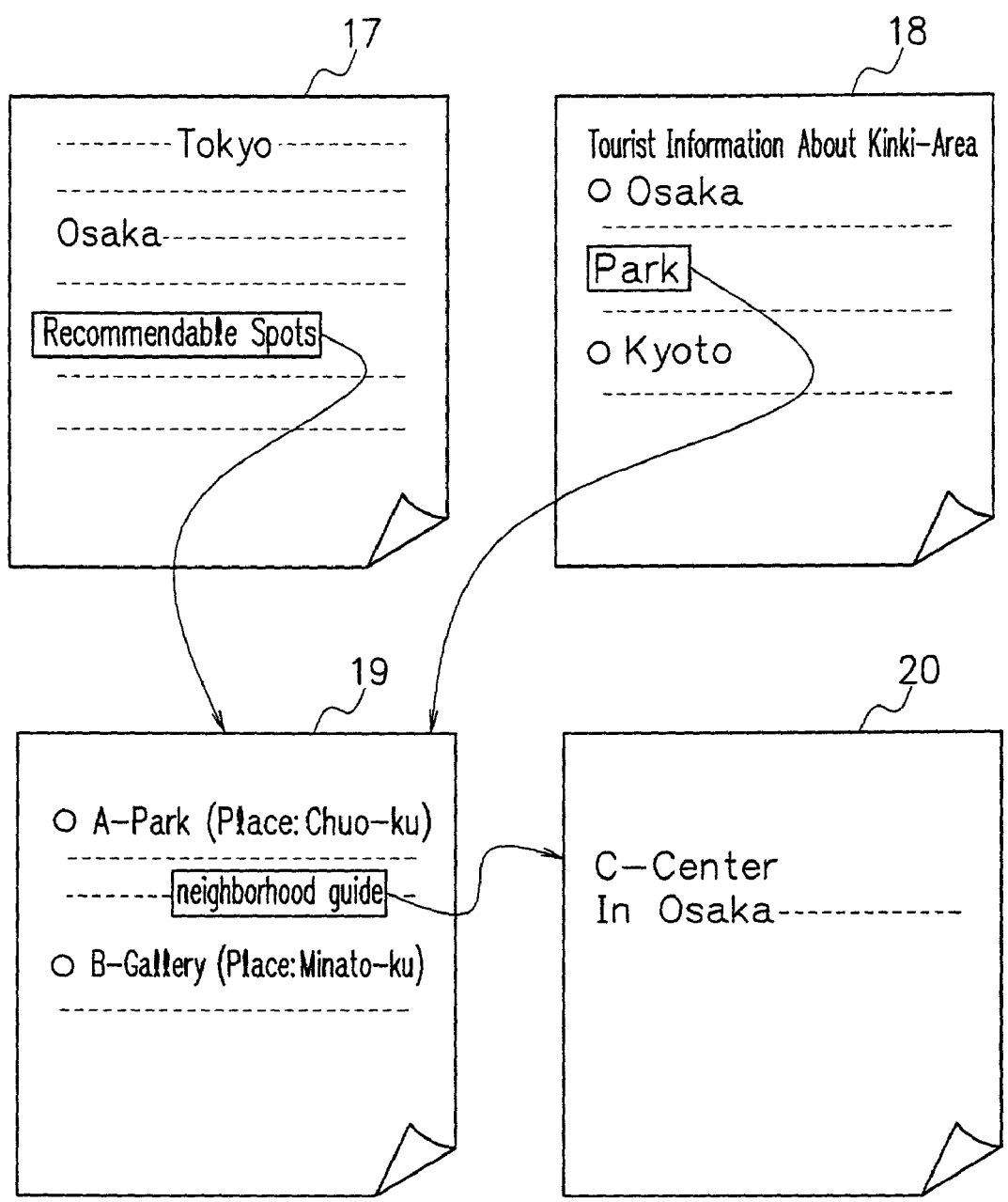
FIG. 9 is a diagram showing another example of processing objects in the embodiment of the present invention.

Incidentally, there are varieties of calculation methods in terms of appearance frequency information of co-occurring words in plural texts. In FIG. 9, for example, the location of "Chuo-ku" in the text 19 is not to be specified by referring to the referring link text 17, in which both co-occurring words "Tokyo" and "Osaka" appear. Consequently, according to the process (D), the analysis is performed referring to plural referring link texts. Additionally, even a linked text(s) is subject to the reference. Referring to the linked text 20 as well as the referring link texts 17 and 18, it is turned out that the co-occurring words "Tokyo", "Kinki-Area", and "Kyoto" appear in the texts once respectively, and "Osaka" appears three times. Thus "Chuo-ku" can be taken as "Chuo-ku" in Osaka in recognition of that "Osaka" makes the most of appearance.

In the above method, the co-occurring word that appears most frequently in the plural texts has priority. On the other hand, there is another method in which the co-occurring word that appears in the most numbers of referring link and linked texts has priority. Referring to FIG. 9, for example, the co-occurring word "Osaka" appears in the three texts, 17, 18, and 20, while "Kinki-Area" and "Kyoto" make their appearance in only the text 18. Thereby "Osaka" is regarded as the co-occurring word appearing in the most numbers of texts, and thereby used as a clue to resolve the ambiguity in the candidate named entity.

Moreover, it is also conceivable that the number of appearances or the number of texts for each co-occurring word is not simply counted, but counted by changing weights (points) at a likelihood summation. The weight varies depending on whether the text is a referring link text or a linked text. For example, an appearance in a referring link text is set at two points and an appearance in a linked text is set at one point. In FIG. 9, "Osaka" earns five points, and "Tokyo", "Kinki-Area" and "Kyoto" scores two points, respectively. Additionally, the weight may be decided by the position where the co-occurring word appears. For instance, four points are given on an appearance in a referring key character string, three points are given on an appearance within a certain range before and after a referring key character string, two points are given on an appearance in a referring link text, and one point is given on an appearance in a linked text.

Figure 10:
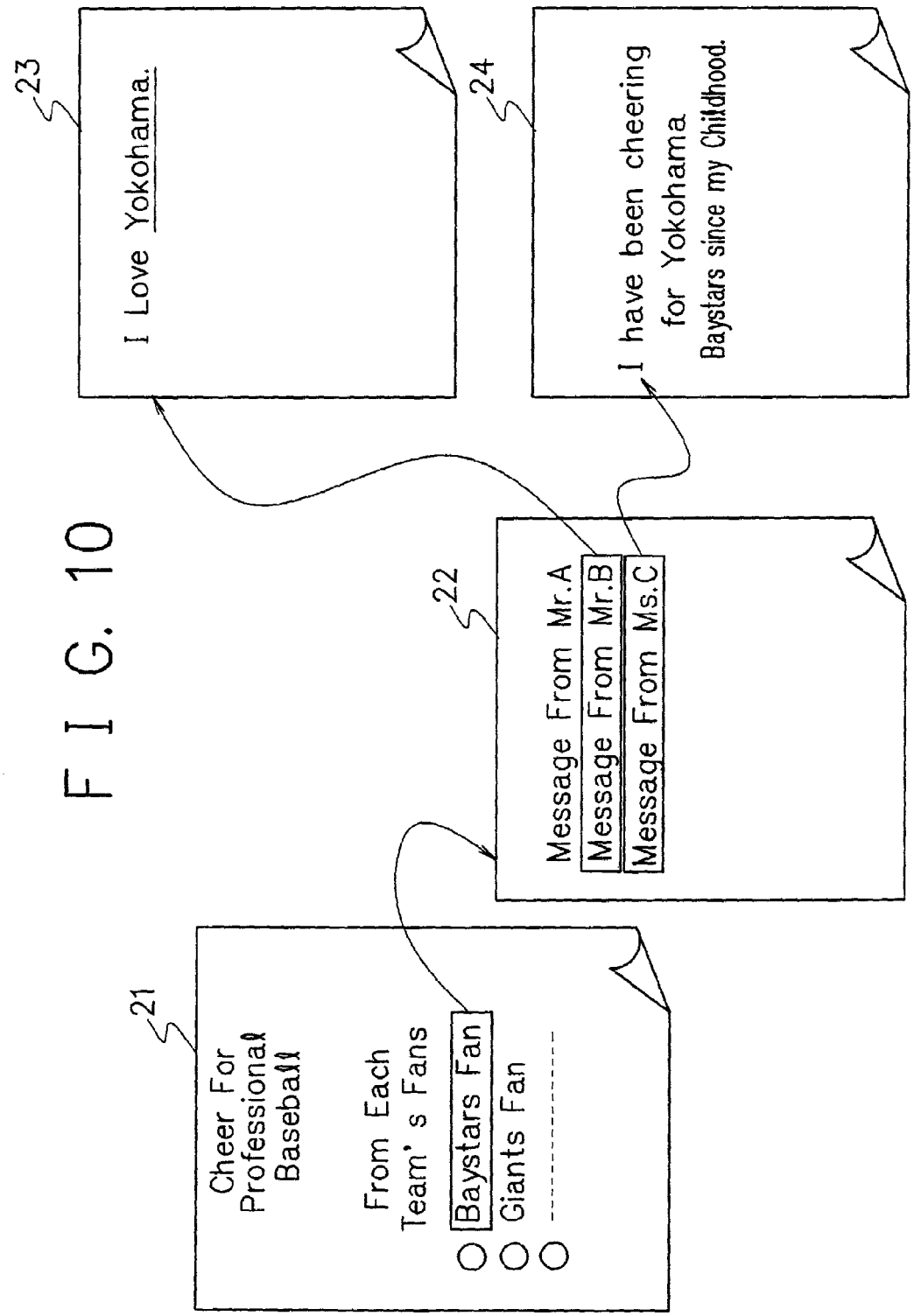
FIG. 10 is a diagram showing another example of processing objects in the embodiment of the present invention.

In the above examples of the processes and operations of the complex text analyzing means 6, links are followed to the extent of one link layer upper or lower from the text containing a candidate named entity to search for its co-occurring words. However, it is possible to search across plural link layers (hierarchies) for the co-occurring words. In the example of FIG. 10, the word "Yokohama" in the text 23 is a candidate named entity, and has a possibility of being a location name as well as an organization name. No co-occurring word being a clue to resolve the ambiguity in the category of "Yokohama" is found in the referring link text at a next link layer. Consequently, the link is further followed to one more upper link layer for referring to the text 21. Thus there is found the co-occurring word "Baystars" in the text 21, and priority is given on the interpretation that "Yokohama" is an organization name. With regard to the analysis referring to texts at plural link layers, there are several approaches to set the reference range. Among them is to set N link layers (N is a value larger than 1) as the reference range from the beginning. Another is to add a link layer to the reference range when the ambiguity cannot be resolved within the reference range. That is, when the ambiguity is not resolved with reference to a referring link text(s) and a linked text(s) at one upper and lower link layers, the link(s)

in the referring link text(s) or linked text(s) is further followed to another layer to search for co-occurring words.

In addition, there is another approach in which layers are not simply added to the reference range. The reference range may include whole the referring link text at the first layer, and just a key character string(s) or a certain range of text before and after a key character string(s) at the second layer. Taking FIG. 10 as an example, whole of the referring link text 22 at the first link layer for the text 23 is subject to the reference, while in the referring link text 21 at the second link layer, only the key character string "Baystars Fan" is subject to the reference.

Furthermore, lower link layers as well as upper link layers may be added to the reference range. In FIG. 10, it is possible to trace back the link by one layer from the text 23 to its referring link text 22, and then follow the link in lower direction to the linked text 24. There are several reference ways such as: referring to the texts 21, 22, and 24 in a range of two layers from the text 23, following the link in the upper direction only and referring the texts 21 and 22, or giving priority to the text in a sibling relationship and referring the texts 22 and 24.

In the following, operations of this embodiment will be explained with reference to the flowchart of FIG. 11.

The reading means 2 reads texts into the input memory 3 from the hypertext database 1 at step S201 in FIG. 11. Depending on the realizing process for the reading means 2, procedures can be carried on by performing the step S201 and ensuing procedural steps alternately. In this explanation, however, taking up the above-mentioned approach (B), texts within a certain range are read in at once, wherein the number of the read texts is N.

The procedural steps subsequent to step S204 are performed for each of N texts. In the flowchart of FIG. 11, after having set the value of k to 1 at step S202, a loop process is executed with k being incremented by 1 at step S209. First, the operation of the step S204 is executed for the text k (k=1 to N). At the step S204, the single text analyzing means 4 analyzes the text k, detects a candidate(s) for the named entity, and writes the candidate(s) into the intermediate memory 5. Here, the number of the detected candidate named entity is Mk, and each candidate named entity is denoted by c [k, j] (j=1 to Mk). Namely, c [k, j] is the j-th candidate named entity detected in the text k.

Next, the procedural steps subsequent to step S207; the part where, after having set the value of j to 1 at step S205, a loop process is executed with increment of j by 1 at step S208; shown in the flowchart of FIG. 11 are performed for each of Mk candidate named entities detected in the text k. For the j-th candidate named entity c [k, j], first the step S207 is executed. At the step S207, the complex text analyzing means 6 estimates the likelihood of the candidate named entity c [k, j] by an analysis with reference to a referring link text(s) or a linked text(s) of the text k, and writes the analysis result into the output memory 7. There is the case where the referring link text and linked text of the text k are not stored in the input memory 3 at the stage of the step S207 depending on the process employed for realizing the reading means 2. In such case, the analysis result of the single text analyzing means 4 may be outputted, or the reading means 2 may as well read the referring link text and linked text at the step S207.

Having completed the estimation of the likelihood for the Mk candidate named entities in the text k, the operation proceeds to processing the next text (k+1) via step S206. When the processes for the N texts have been finished, the whole operations in the flowchart are completed after going through step S203.

In the following, the second embodiment of the present invention will be described in detail with reference to the drawings.

Figure 12:
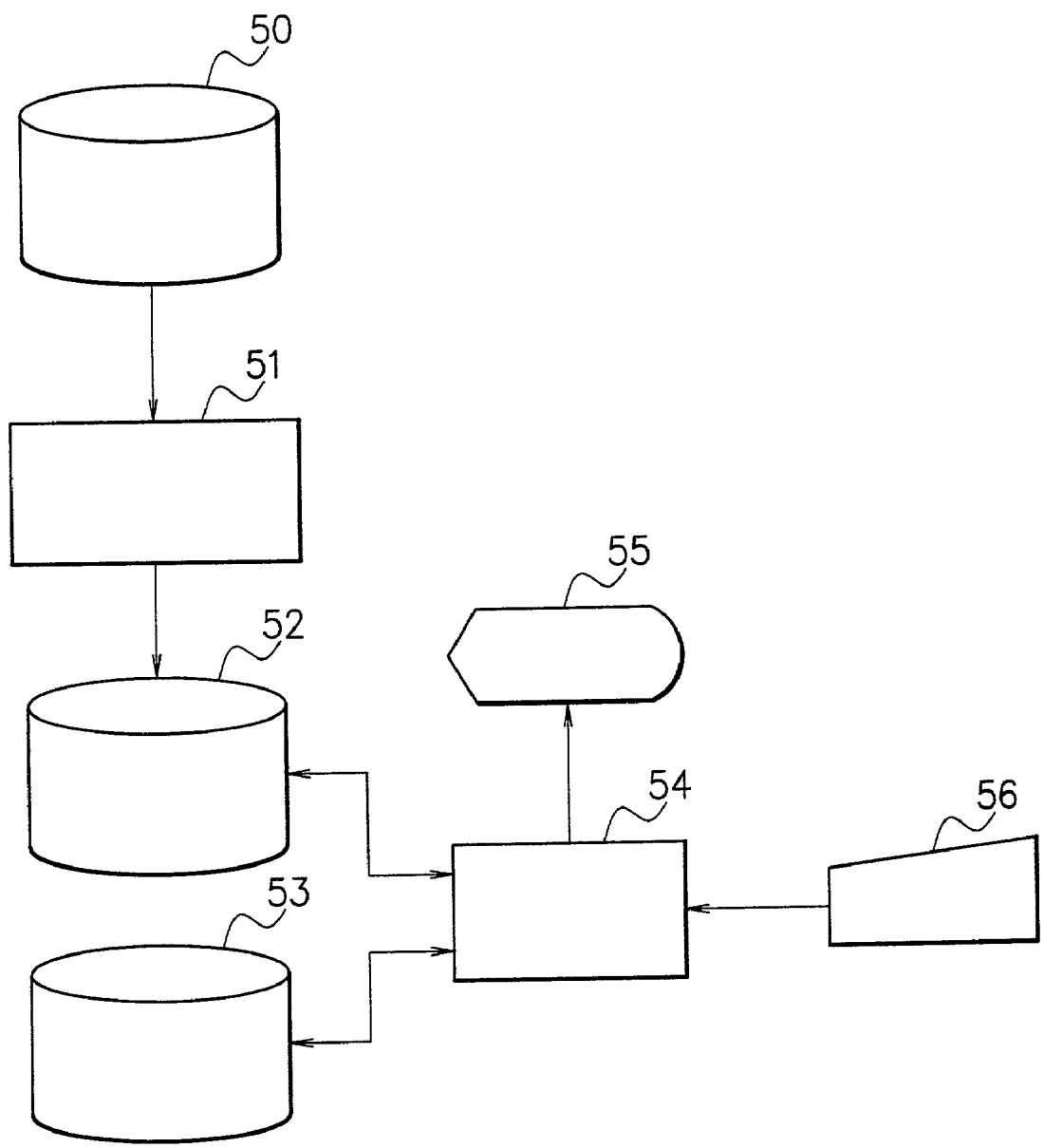
FIG. 12 is a block diagram showing the second embodiment of the present invention.

FIG. 12 is a block diagram showing a configuration of a map information retrieval device using a named entity discriminating system according to the present invention. As shown in FIG. 12, a map information retrieval device using a named entity discriminating system comprises: a hypertext database 50, a named entity discriminating system 51, a location dependency contents database 52, a map database 53, a database retrieval device 54, a display 55, and a positional condition input device 56.

The hypertext database 50 stores hypertext. The WWW on the Internet, for example, corresponds to the hypertext database.

The named entity discriminating system 51 detects location names in the text stored in the hypertext database 50 as described in the first embodiment. In this embodiment, named entities that are identified as the location name are processed.

Figures 13, 14:
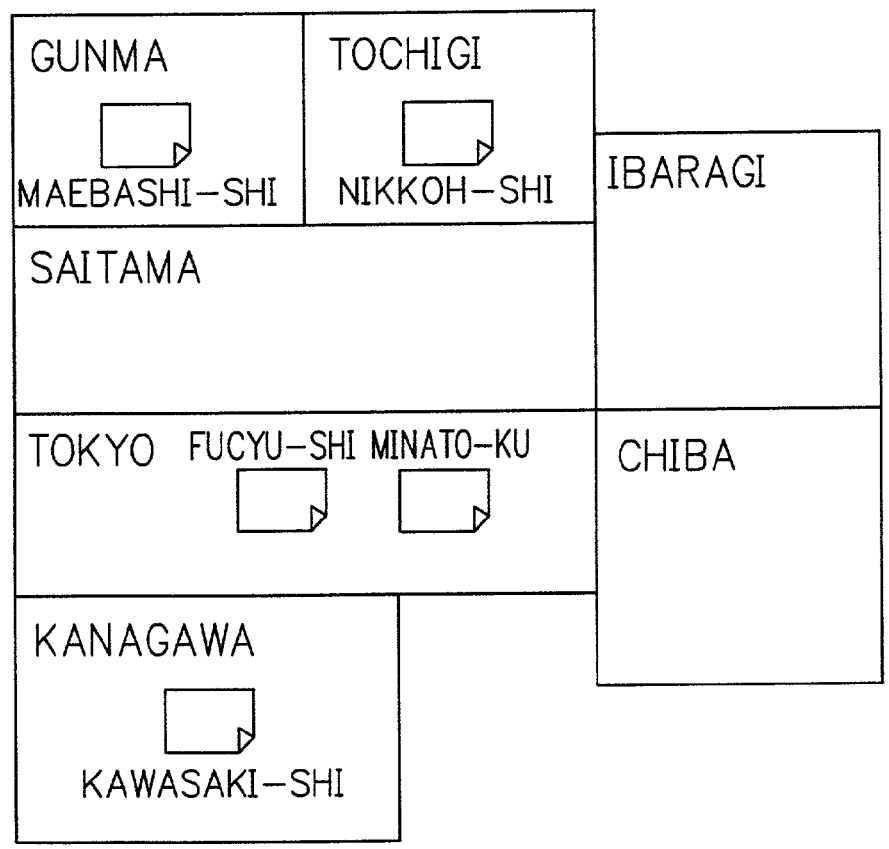
FIG. 13 is a diagram showing contents of data in a location dependent contents database.
FIG. 14 is a diagram showing a display of a cartographic information detecting device.

The location dependency contents database 52 stores location names 60 and node page numbers 61 as shown in FIG. 13. The location names 60 and node page numbers 61 correspond to each other. For instance, the node page 31 corresponds to the location name "Minato-ku, Tokyo" and the node page 40 corresponds to the location name "Maebashi, Gunma".

The map database 53 stores two-dimensional coordinate data and location names mapped thereon.

The positional condition input device 56 is used when a user inputs a location name, such as "Minato-ku, Tokyo". A system for automatically retrieving the current location of a human and an automobile such as GPS (Global Positioning System), in addition to a character string input means as a keyboard and a pointing device as a mouse can be used as the positional condition input device.

The database retrieval device 54 searches the location dependency contents database 52 and the map database 53 on the condition specified by the positional condition input device 56, and displays the result on the display 55.

FIG. 14 shows an example in which contents are indicated on a map using the location dependency contents database 52. Here, location names in the Kanto-district are designated by the positional condition input device 56.

Figure 15:
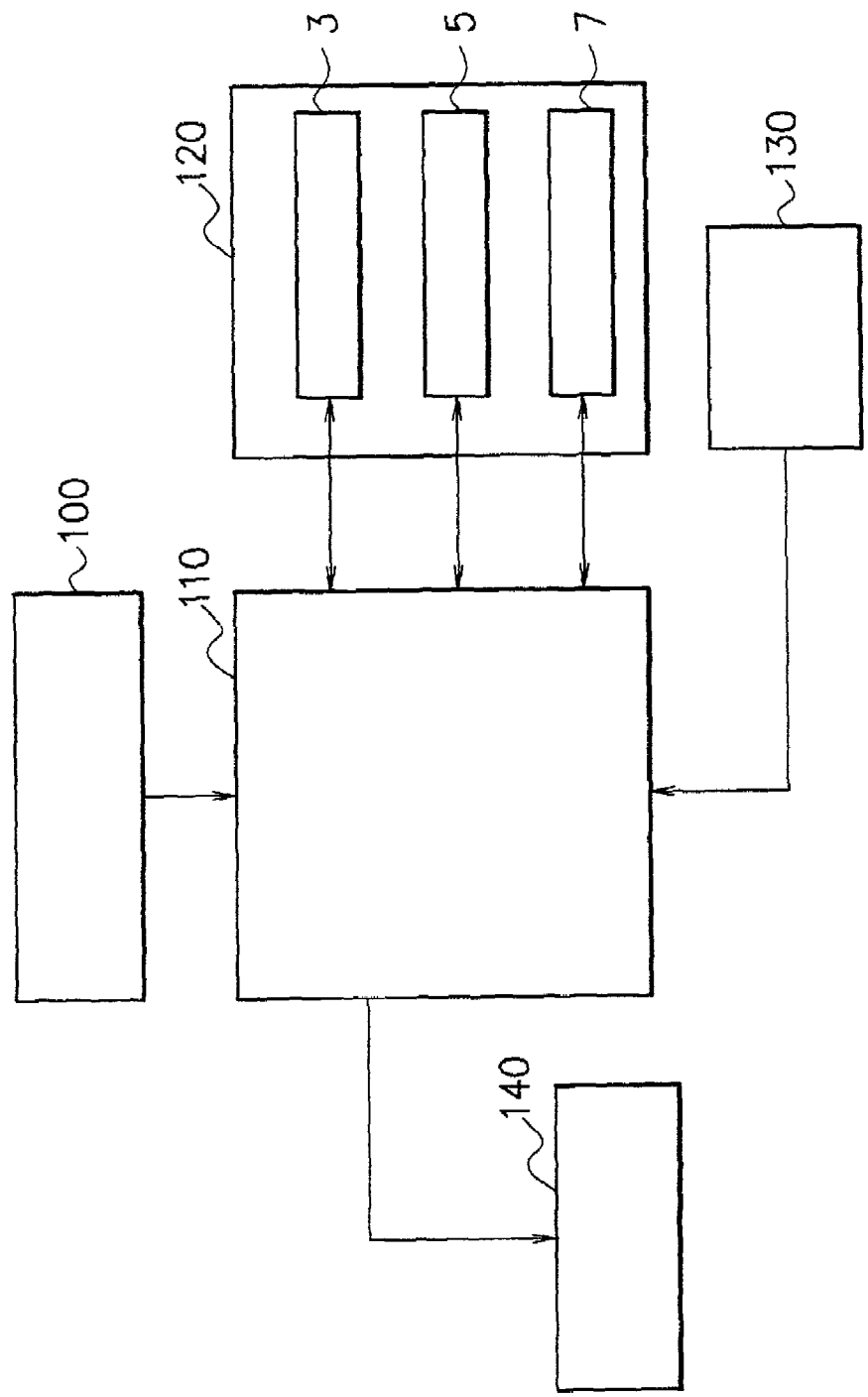
FIG. 15 is a block diagram showing the third embodiment of the present invention.

In the following, the third embodiment of the present invention will be described in detail with reference to the drawing. As shown in FIG. 15, the third embodiment of the present invention comprises: an input device 100, a data processing device 110, a storage device 120, an output device 140, and further, a recording medium 130 that stores a program for realizing the named entity discriminating system of the first embodiment. The recording medium 130 is at least one selected from a magnetic disk, a semiconductor memory, a CD-ROM, or other recording media.

The input device 100 is a device such as a mouse or a keyboard for inputting commands of an operator. The output device 140 is a device such as a display or a printer for outputting the processing result of the data processing device 110.

The program for realizing the named entity discriminating system is read into the data processing device 110 from the recording medium 130. The program controls the operation of the data processing device 110, and produces the input memory 3, the intermediate memory 5, and the output memory 7 in the storage device 120. The data processing device 110 operates in the same manner as the reading means 2, the single text analyzing means 4, and a complex text analyzing means 6 in the first embodiment by control of the program for realizing the named entity discriminating system.

Next, the fourth embodiment of the present invention will be explained in detail referring to the drawing. As shown in FIG. 16, the fourth embodiment of the present invention comprises: an input device 200, a data processing device 210, a storage device 220, an output device 240, and further, a recording medium 230 that stores a program for realizing the map information retrieval device of the second embodiment. The recording medium 230 is at least one selected from a magnetic disk, a semiconductor memory, a CD-ROM, or other recording media.

The input device 200 is a device such as a mouse or a keyboard for inputting commands of an operator. The output device 240 is a device such as a display or a printer for outputting the processing result of the data processing device 210.

The program for realizing the map information retrieval device is read into the data processing device 210 from the recording medium 230. The program controls the operation of the data processing device 210 and produces the input memory 3, the intermediate memory 5, the output memory 7, the location dependency contents database 52, and the map database 53 in the storage device 220. The data processing device 210 is controlled by the program for realizing the map information retrieval device and executes the same operations as those executed by the reading means 2, the single text analyzing means 4, a complex text analyzing means 6 in the first embodiment, and the database retrieval device 54 in the second embodiment.

As set forth hereinabove, the named entity discriminating system according to the present invention performs an analytical operation referring to not only the text in which a named entity appears, but also referring link text and linked text. Thus it is made possible to discriminate names entities with a higher degree of accuracy and less ambiguity in comparison with conventional technique.

While the preferred embodiments of the present invention has been described using specific terms, such description is for illustrative purposes only, and it is to be understood that changes and variations may be made without departing from the spirit or the scope of the following claims.

What is claimed is:

1. A named entity discriminating system for detecting named entities as belonging to one of location names, personal names and organization names in text, comprising:
   a reading means for reading text from a hypertext database;
   a single text analyzing means for analyzing at least a first text from a referring link page and separately analyzing a second text from a linked page, said linked page being linked to said referring link page by a hyperlink in said hypertext database, said analyzing means providing named entity candidates for at least one named entity appearing in at least one of said first text and second text, said named entity candidates being one of location names, personal names and organization names; and
   a complex text analyzing means for estimating the likelihood of the named entity candidates detected by the single text analyzing means by an analysis with reference to the first text in the referring link page and the second text in the linked page.

2. A named entity discriminating system as claimed in claim 1, wherein the complex text analyzing means estimates the likelihood of the candidate named entity detected by the single text analyzing means based on:
   appearance frequency information of words co-occurring with the named entity candidates in at least one of the referring link page and the linked page;
   co-occurrence relations between the named entity candidates and a key character string in the referring link page of the text in which the named entity candidates appears; or
   appearance frequency information of words co-occurring with the named entity candidates in a specified range before and after a key character string in the referring link page of the text in which the named entity candidates appears.

3. A named entity discriminating system as claimed in claim 2, wherein when no co-occurring word is detected in the referring link page and/or linked page of the text in which the named entity candidates appears, the complex text analyzing means detects the co-occurring words referring to the referring link page or the linked page of the text in which no co-occurring word is detected.

4. A named entity discriminating system as claimed in claim 2, wherein the complex text analyzing means follows a link from the text in which the named entity candidates appears to referring link page or linked page, and searches prescribed link layers from the text specified as a reference range for the co-occurring word.

5. A named entity discriminating system as claimed in claim 2, wherein the complex text analyzing means estimates the likelihood of the named entity candidates based on the weight which is assigned to each co-occurring word according to the position thereof.

6. A named entity discriminating method, comprising steps of:
   reading text from a hypertext database;
   analyzing at least a first text from a referring link page and separately analyzing a second text from a linked page, said linked page being linked to said referring link page by a hyperlink in said hypertext database, said analyzing means providing named entity candidates for at least one named entity appearing in at least one of said first text and second text, said named entity candidates being one of location names, personal names and organization name; and
   estimating the likelihood of the named entity candidates by an analysis with reference to the first text in the referring link page and the second text in the linked page.

7. A named entity discriminating method as claimed in claim 6, wherein the likelihood of the named entity candidates is estimated based on:
   appearance frequency information of words co-occurring with the named entity candidates in at least one of the referring link page and the linked page;
   co-occurrence relations between the named entity candidates and a key character string in the referring link page of the text in which the named entity candidates appears; or
   appearance frequency information of words co-occurring with the named entity candidates in a specified range before and after a key character string in the referring link page of the text in which the named entity candidates appears.

8. A named entity discriminating method as claimed in claim 7, wherein when no co-occurring word is detected in the referring link page and/or linked page of the text in which the named entity candidates appears, the co-occurring words are detected referring to the referring link page or the linked page of the text in which no co-occurring word is detected.

9. A named entity discriminating method as claimed in claim 7, wherein the likelihood of the candidate named entity is estimated by following a link from the text in which the named entity candidates appears to the referring link page or the linked page, and searching prescribed link layers from the text specified as a reference range for the co-occurring word.

10. A named entity discriminating method as claimed in claim 7, wherein the likelihood of the named entity candidates is estimated based on the weight which is assigned to each co-occurring word according to the position thereof.

11. A storage medium for storing a computer program which, when executed on a computer, causes the computer to execute processes including:
- a reading process for reading text from a hypertext database;
- a single text analyzing process for analyzing at least a first text from a referring link page and separately analyzing a second text from a linked page, said linked page being linked to said referring link page by a hyperlink in said hypertext database, said analyzing process providing named entity candidates for at least one named entity appearing in at least one of said first text and second text, said named entity candidates being one of location names, personal names and organization names; and
- a complex text analyzing process for estimating the likelihood of the named entity candidates detected in the single text analyzing process by an analysis referring to the referring link page and the linked page of the text in which the named entity candidates appears.

12. The storage medium for storing a computer program as claimed in claim 11, wherein the complex text analyzing process estimates the likelihood of the named entity candidates detected by the single text analyzing process based on:
- appearance frequency information of words co-occurring with the named entity candidates in the referring link page and the linked page;
- co-occurrence relation between the named entity candidates and a key character string in the referring link page of the text in which the named entity candidates appears; or
- appearance frequency information of words co-occurring with the named entity candidates in a specified range before and after a key character string in the referring link page of the text in which the named entity candidates appears.

13. The storage medium for storing a computer program as claimed in claim 12, wherein when no co-occurring word is detected in the referring link page and/or the linked page of the text in which the named entity candidates appears, the complex text analyzing process detects the co-occurring words referring to the referring link page or the linked text of the text in which no co-occurring word is detected.

14. The storage medium for storing a computer program as claimed in claim 12, wherein the complex text analyzing process follows a link from the text in which the named entity candidates appears to the referring link page or the linked page, and searches prescribed link layers from the text specified as a reference range for the co-occurring word.

15. The storage medium for storing a computer program as claimed in claim 12, wherein the complex text analyzing process estimates the likelihood of the named entity candidates based on the weight which is assigned to each co-occurring word according to the position thereof.

* * * * *